Patented Feb. 2, 1954

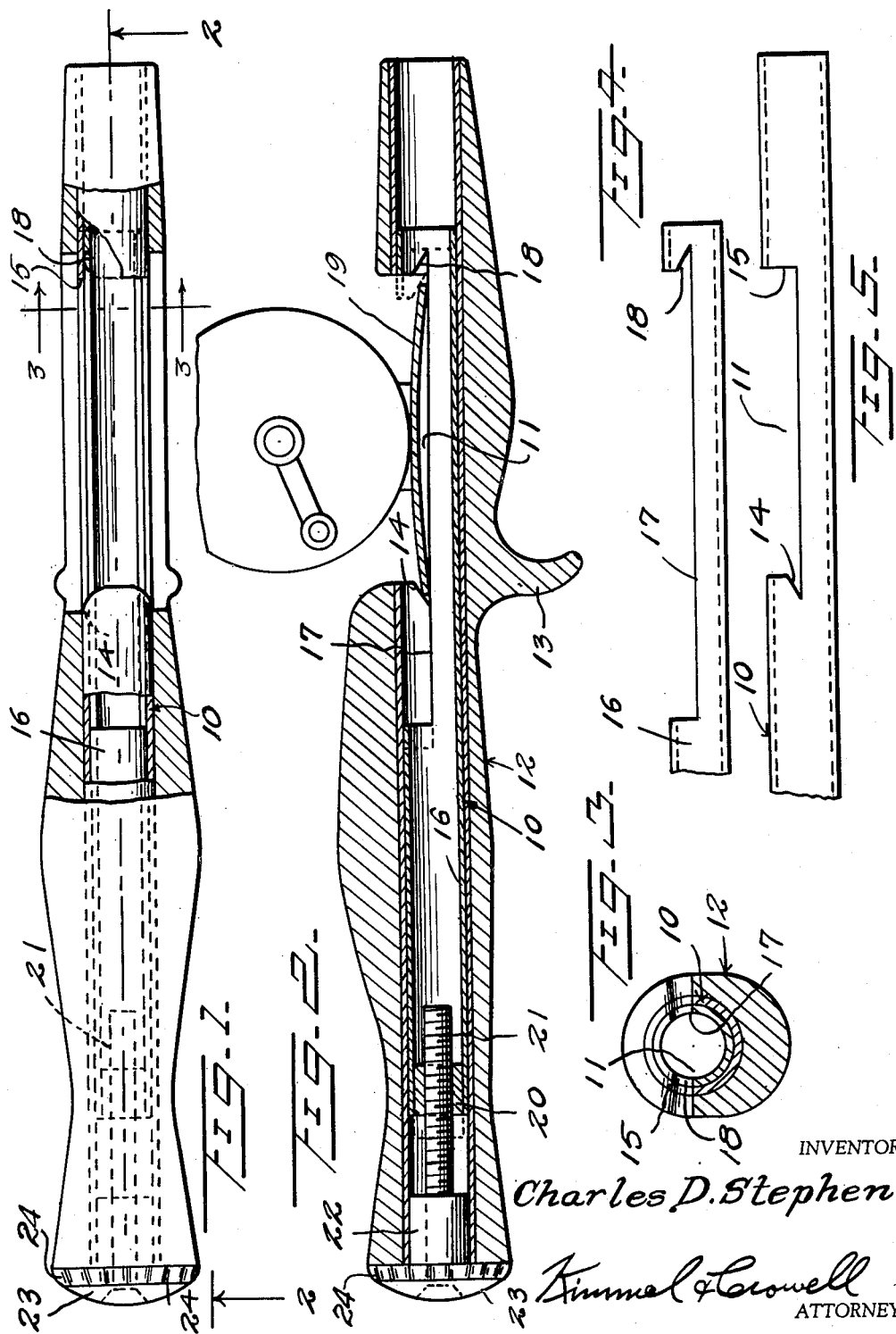

2,667,713

UNITED STATES PATENT OFFICE 2,667,713

FISHING ROD AND REEL CLAMP

Charles D. Stephens, San Antonio, Tex.

Application July 22, 1952, Serial No. 300,144

2 Claims. (Cl. 43—22)

This invention relates to a fishing rod handle and means for clamping a reel to the handle.

An object of this invention is to provide in a fishing rod handle an improved means for clamping a fishing reel to the handle, the clamping means also forming means for reinforcing the handle and for distributing any bending stresses to the rear end of the handle.

Another object of this invention is to provide an improved reel clamping means which is simple in construction and will not accidentally become loose.

A further object of this invention is to provide reel clamping means embodying a stationary V-shaped jaw and a movable V-shaped jaw with an operator for the movable jaw mounted on the rear end of the handle.

With the above and other objects in view, my invention consists in the arrangement, combination and details of construction disclosed in the drawing and specification, and then more particularly pointed out in the appended claims.

In the drawing—

Figure 1 is a plan view partly broken away and in section of a fishing rod handle having a clamping means for the reel constructed according to an embodiment of this invention, Figure 2 is a sectional view taken on the line 2—2 of Figure 1, Figure 3 is a sectional view taken on the line 3—3 of Figure 1, Figure 4 is a fragmentary side elevation of the movable clamping member, Figure 5 is a fragmentary side elevation of the stationary clamping member.

Referring to the drawing, the numeral 10 designates generally an elongated metal tube which is formed with a cutout portion 11 adjacent the forward end thereof, and the tube 10 is encased in a handle generally designated as 12. The handle 12 may be formed of cork or other suitable material, and the handle 12 is provided at a point adjacent the rear portion of the cutout 11 with a hook or finger engaging member 13.

The inner or rear end of the fishing rod is adapted to be secured in any suitable manner to the forward end of the tubular member 10. The cutout portion 11 includes a substantially V-shaped stationary jaw 14 formed at the rear of the cutout portion and a right angular reel base releasing cutout 15 is formed at the forward end of the cutout portion 11. A tubular slide member 16 is slidably disposed within the tubular member 10 and is formed adjacent the forward end thereof with a relatively long cutout portion 17. The forward end of the cutout portion 17 is formed into a substantially V-shaped jaw 18 therein which is adapted to confront the jaw 14 and which is adapted to tightly engage or clamp against the forward end of a reel base 19. The rear end of the reel base 19 is adapted to tightly engage the stationary jaw 14. The inner tubular member or slide 16 has fixedly mounted in the rear thereof a plug 20 and a threaded bolt 21 is fixed in the plug 20 and extends rearwardly from the rear end of the slide 16.

A nut 22 is threaded on the projecting end of the bolt 21 and is formed with a cap 23 which bears against the rear end of the handle 12. The cap 23 is provided with serrations 24 by means of which the cap 23 may be readily rotated to provide for tightly clamping the reel base 19 between the jaws 14 and 18 or to release the reel base 19 from between these clamping jaws.

In the use of this reel clamping means, the reel base 19 is extended into the cutout portion 11 and the rear end of the reel base is initially engaged with the stationary jaw 14. Nut 22 is rotated to pull slide member 16 and jaw 18 rearwardly so that the V-shaped jaw 18 will tightly engage over the forward end of base 19 and will pull the latter tightly against the stationary jaw 14. The outer tubular member 10 extends entirely through the handle 12 and forms a reinforcing means for the handle in addition to providing a guide means for the slide 16. Inasmuch as pressure is applied to the jaws 14 and 18 from the rear end of the handle 12, any pulling or bending stresses incurred by the fishing line will be transmitted to the rear end of the handle.

I do not mean to confine myself to the exact details of construction herein disclosed, but claim all variations falling within the purview of the appended claims.

What I claim is:

1. A fishing rod handle and reel clamp comprising an elongated tubular member having an elongated cutout portion adjacent the forward end thereof, the rear end of said cutout portion having a V-shaped notch formed therein constituting a rear fixed clamping jaw, a handle encompassing said member and having a cutout portion registering with said first named cutout portion, an inner tubular member slidably mounted in said elongated tubular member and formed with a cutout portion and a movable clamping jaw at the forward end of said last named cutout portion, and means for moving said inner tubular member rearwardly with respect to said first named tubular member to thereby clamp a reel base between said jaws.

2. A fishing rod handle and reel clamp comprising an elongated tubular member having an elongated cutout portion adjacent the forward end thereof, the rear end of said cutout portion having a V-shaped notch formed therein constituting a rear fixed clamping jaw, a handle encompassing said member and having a cutout portion registering with said first named cutout portion, an inner tubular member slidably mounted in said elongated tubular member and formed with a cutout portion and a movable clamping jaw at the forward end of said last named cutout portion, a threaded stud fixed in the rear end of said inner tubular member, a nut threaded on said stud, and a cap carried by said nut engaging against the rear end of said handle.

CHARLES D. STEPHENS.

References Cited in the file of this patent

UNITED STATES PATENTS

| Number | Name | Date |
|---|---|---|
| 2,554,787 | McGuire | May 29, 1951 |

FOREIGN PATENTS

| Number | Country | Date |
|---|---|---|
| 169,044 | Great Britain | Sept. 22, 1951 |